United States Patent
Anglin et al.

(10) Patent No.: US 6,841,302 B2
(45) Date of Patent: Jan. 11, 2005

(54) ALKALINE CELL WITH IMPROVED CATHODE

(75) Inventors: David L. Anglin, Brookfield, CT (US); J. Simon Xue, Bethel, CT (US); Francis P. Wang, Newtown, CT (US)

(73) Assignee: The Gillette Company, Boston, MA (US)

( * ) Notice: Subject to any disclaimer, the term of this patent is extended or adjusted under 35 U.S.C. 154(b) by 509 days.

(21) Appl. No.: 09/954,280

(22) Filed: Sep. 17, 2001

(65) Prior Publication Data

US 2003/0068552 A1 Apr. 10, 2003

(51) Int. Cl.$^7$ .............................................. H01M 4/36
(52) U.S. Cl. .................... 429/220; 429/229; 429/231.8; 429/232
(58) Field of Search ................................ 429/224, 232, 429/231.18, 220, 229

(56) References Cited

U.S. PATENT DOCUMENTS

| | | | |
|---|---|---|---|
| 1,255,283 A | 2/1918 | Benner | |
| 1,282,057 A | 10/1918 | Erwin | |
| 1,564,741 A | 12/1925 | Wolfe | |
| 4,060,676 A | 11/1977 | Day | |
| 5,482,798 A | 1/1996 | Mototani | |
| 5,594,060 A | 1/1997 | Alig | |
| 5,744,014 A * | 4/1998 | Gordon et al. | 204/266 |
| 5,846,509 A | 12/1998 | Alig | |
| 6,156,256 A | 12/2000 | Kennel | |
| 6,248,478 B1 | 6/2001 | Friend | |

FOREIGN PATENT DOCUMENTS

| | | | |
|---|---|---|---|
| JP | 54-101135 A | | 8/1979 |
| JP | 07014582 A | | 1/1995 |
| WO | WO 95/302248 | * | 9/1995 |

OTHER PUBLICATIONS

International Committee For Characterization and Terminology of Carbon, Journal Carbon, vol. 20, No. 5 (1982), pp. 445–449, no month available.

U.S. Appl. No. 09/658,042 filed Sep. 7, 2000 (Commonly Assigned to the Gillette Company).

* cited by examiner

Primary Examiner—Bruce F. Bell
(74) Attorney, Agent, or Firm—Barry D. Josephs; Paul I. Douglas; Thomas G. Krivulka

(57) ABSTRACT

An alkaline cell having an anode comprising zinc, an aqueous alkaline electrolyte, a cathode mixture comprising cathode active material comprising copper oxide or copper hydroxide. Graphitic carbon, preferably expanded graphite or graphitic carbon nanofibers are added to the cathode mixture thereby resulting in a sharp drop in cathode resistivity. The cathode active material preferably comprises between about 80 and 92 percent by weight of the cathode. The sharp drop in cathode resistivity resulting from the addition of expanded graphite or graphitic carbon nanofibers makes the cell suitable for use as a primary alkaline cell having good capacity. The graphitic carbon, preferably graphitic nanofibers comprise preferably between about 4 and 10 percent by weight of the cathode. The carbon nanofibers have an average diameter desirably less than 500 nanometers, preferably between about 50 and 300 nanometers.

35 Claims, 2 Drawing Sheets

ALKALINE CELL WITH IMPROVED CATHODE

FIELD OF THE INVENTION

This invention relates to an aqueous alkaline cell with a cathode comprising copper oxide or copper hydroxide, particularly such cathodes with a conductive additive of expanded graphite or graphitic carbon nanofibers.

BACKGROUND OF THE INVENTION

Conventional alkaline electrochemical cells have an anode comprising zinc and a cathode comprising manganese dioxide. The cell is typically formed of a cylindrical casing. The casing is initially formed with an enlarged open end and opposing closed end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing at the closed end forms the positive terminal.

Primary alkaline electrochemical cells typically include a zinc anode active material, an alkaline electrolyte, a manganese dioxide cathode active material, and an electrolyte permeable separator film, typically of cellulose or cellulosic and polyvinylalcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable since it has a high density and high purity. The electrical conductivity (resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector. Suitable electrically conductive additives can include, for example, conductive carbon powders, such as carbon blacks, including acetylene blacks, flaky crystalline natural graphite, flaky crystalline synthetic graphite, including expanded or exfoliated graphite. The resistivity of graphites such as flaky natural or expanded graphites can typically be between about $3\times10^{-3}$ ohm-cm and $4\times10^{-3}$ ohm-cm.

It is desirable for a primary alkaline battery to have a high discharge capacity (i.e., long service life). Since commercial cell sizes have been fixed, it is known that the useful service life of a cell can be enhanced by packing greater amounts of the electrode active materials into the cell. However, such approach has practical limitations such as, for example, if the electrode active material is packed too densely in the cell, the rates of electrochemical reactions during cell discharge can be reduced, in turn reducing service life. Other deleterious effects such as cell polarization can occur as well. Polarization limits the mobility of ions within both the electrolyte and the electrodes, which in turn degrades cell performance and service life. Although the amount of active material included in the cathode typically can be increased by decreasing the amount of non-electrochemically active materials such as polymeric binder or conductive additive, a sufficient quantity of conductive additive must be maintained to ensure an adequate level of bulk conductivity in the cathode. Thus, the total active cathode material is effectively limited by the amount of conductive additive required to provide an adequate level of conductivity.

Although such alkaline cells are in widespread commercial use there is a need to improve the cell or develop a new type of cell that is cost effective and exhibits reliable performance as well as high capacity (mAmp-hours) and high service life for normal applications such as flashlight, radio, and portable CD players.

SUMMARY OF THE INVENTION

An aspect of the invention is directed to a primary (nonrechargeable) electrochemical alkaline cell having an anode comprising zinc and a cathode mixture comprising copper oxide (CuO) or copper hydroxide ($Cu(OH)_2$) cathode active material. If copper oxide is employed in the cathode mixture, its purity is desirably at least 97, preferably at least 99 percent by weight, desirably between about 97 and 99.8 percent by weight, e.g. about 99.5 percent by weight. A graphitic carbon is added to the cathode mixture. It has been determined that a graphitic carbon comprising expanded graphite or graphitic carbon nanofibers or mixtures thereof provides a very suitable conductive additive. Such graphitic carbon material significantly reduces the cathode resistance, elevates the cell's running voltage and increases cell capacity and performance. The addition of graphitic carbon nanofibers to cathodes comprising copper oxide or copper hydroxide is particularly desirable. The conductive material thus is desirably composed essentially entirely of expanded graphite or graphitic carbon nanofibers or mixtures thereof. Preferably, the cathode mixture comprises between about 3 and 10 percent by weight, preferably between 4 and 10 percent by weight of the graphitic carbon nanofibers. Preferably, the graphitic carbon nanofibers have a mean average diameter less than 500 nanometer, more preferably less than 300 nanometers. Desirably the graphitic carbon nanofibers have a mean average diameter between about 50 and 300 nanometers, typically between about 50 and 250 nanometers.

The anode and cathode include an aqueous alkaline solution, preferably aqueous KOH solution. The cathode desirably comprises between about 4 and 10 percent by weight of the conductive additive. The copper oxide is preferably in the form of a powder having an average particle size between about 1 and 100 micron. The cathode mixture includes an aqueous KOH solution, desirably having a concentration of between about 30 and 40 percent by weight, preferably between 35 and 45 percent weight KOH in water. The aqueous KOH solution desirably comprises between about 5 and 10 percent by weight of the cathode mixture. The cathode active material comprising copper oxide or copper hydroxide, preferably comprises between about 80 and 92 percent by weight of the cathode mixture.

DETAILED DESCRIPTION

Figure 1:
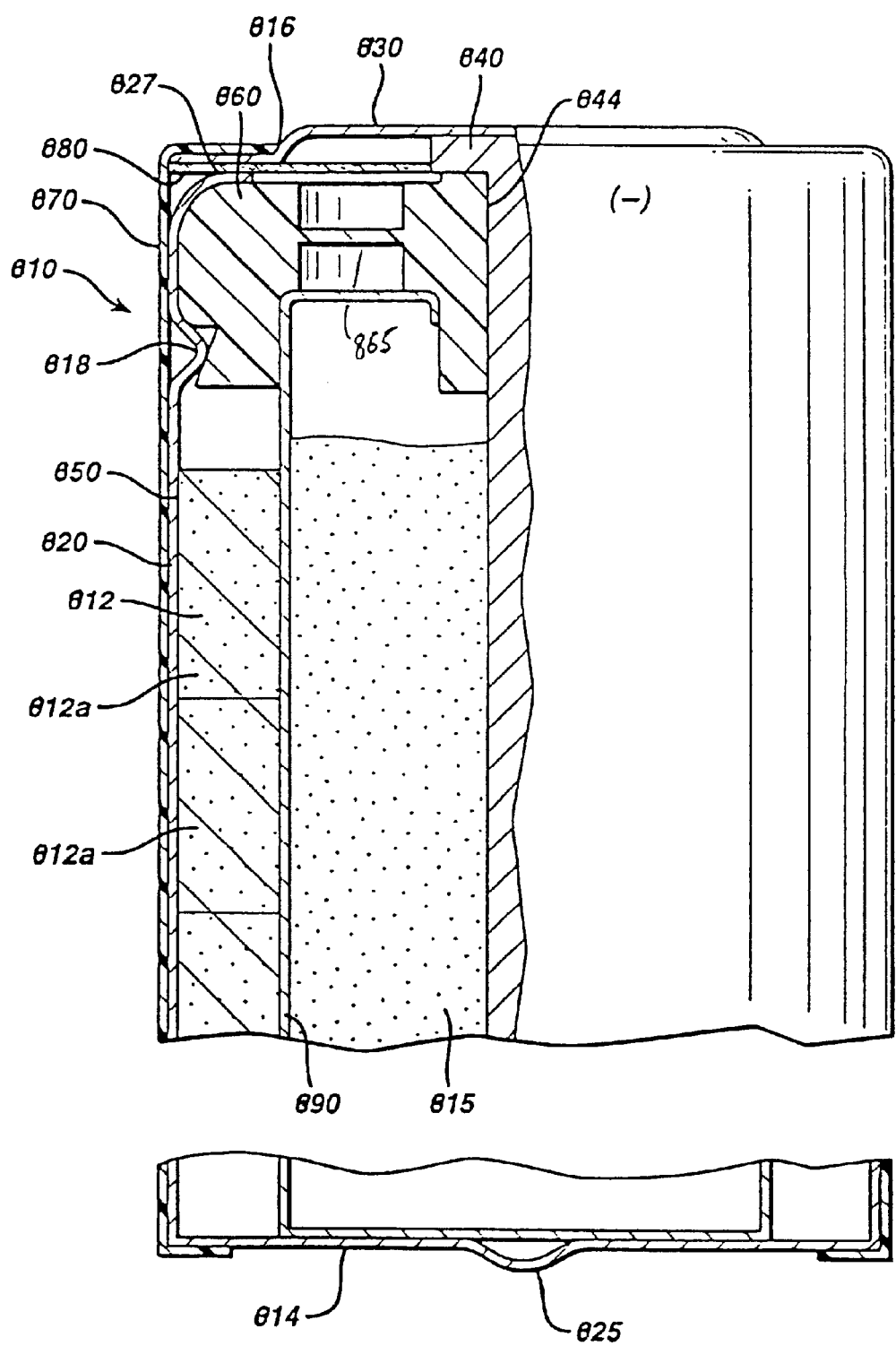
FIG. 1 is a cross-sectional cut away view of an elongated cylindrical alkaline cell having the cathode of the invention.

A representative alkaline cell utilizing the cathode mixture of the invention is shown in FIG. 1. The alkaline cell 810 comprises a cylindrical casing 820 of steel, preferably nickel plated steel, having a closed end 814 and an open end 816. The cell is preferably filled with an anode mixture 815 comprising zinc anode active material and a cathode mixture 812 of the invention comprising copper oxide (CuO) or copper hydroxide cathode active material. (The terms anode active material and cathode active material as used herein means the chemical material in the anode and cathode, respectively, which undergoes electrochemical reaction during cell discharge.) The cathode active material desirably comprises between about 80 and 92 percent by weight of the cathode mixture 812.

The cathode mixture 812 comprises a graphitic carbon material, desirably expanded graphite particles or graphitic carbon nanofiber and any mixture thereof. In such case the total conductive carbon in the cathode mixture desirably comprises between about 3 and 10 percent by weight of the cathode, preferably between about 4 and 10 percent by weight of the cathode. The graphitic carbon additive can be comprised essentially of expanded graphite or graphitic carbon nanofibers. Preferably, the cathode mixture comprises between about 3 and 10 percent by weight, preferably between 4 and 10 percent by weight of the graphitic carbon nanofibers. Desirably, the conductive material can be composed essentially entirely of graphitic carbon nanofiber.

The cathode mixture 812 also desirably comprises between about 5 and 10 percent by weight of an aqueous solution of KOH, which preferably has a strength of between about 7 and 9 Normal (30 and 40 wt. % KOH). The resistivity of pure copper oxide or copper hydroxide is high and thus unsuitable as a cathode active material without a highly conductive additive. The addition of graphitic carbon nanofibers or expanded graphite in amount preferably between about 4 and 10 percent by weight to a cathode mixture comprising high percentage copper oxide or copper hydroxide, e.g. over 75 percent by weight, reduces the resistivity of the mixture quite dramatically. The addition of graphitic carbon nanofibers to the cathode mixture can reduce the cathode resistivity even more than the same amount of expanded graphite additive. The addition of expanded graphite or graphitic carbon nanofibers to cathodes comprising copper oxide or copper hydroxide cathode active material makes it possible to use the cell as a replacement for conventional Zn/MnO2 alkaline cells for use in normal discharge regimes. Additionally at low discharge rates, e.g. at a level of about 9 mAmp, the alkaline cell of the invention exhibits even higher capacity (mAmp-hrs) than conventional Zn/MnO2 alkaline cells. Thus, the addition of the expanded graphite or graphitic carbon nanofibers in small amount between about 3 and 10 percent by weight, preferably between 4 and 10 percent by weight, changes a cathode active material such as copper oxide or copper hydroxide from a material that is essentially not useful as a cathode material for alkaline cells to a material which exhibits very good discharge performance characteristics in such cell.

Similarly it has been determined that such graphitic carbon nanofibers can be beneficially added to zinc alkaline cells having a cathode active material comprising copper oxide (CuO) or copper hydroxide (Cu(OH)$_2$). The addition of such graphitic carbon nanofibers, e.g. in amount between about 3 and 10 percent by weight, desirably between about 4 and 10 percent by weight, typically between 4 and 8 percent by weight of an alkaline cell cathode comprising copper oxide or copper hydroxide, reduces the cathode resistivity quite substantially. This raises the running voltage of the cell and increases the cell capacity (mAmp-hrs).

The term "graphite" or "graphitic material" as used herein shall include natural and synthetic crystalline graphites, expanded graphites, graphitic carbons, and graphitic carbon fibers. A graphitic carbon has the characteristics of an ordered three-dimensional graphite crystalline structure consisting of layers of hexagonally arranged carbon atoms stacked parallel to each other as determined by X-ray diffraction. As defined in International Committee for Characterization and Terminology of Carbon (ICCTC, 1982), published in the *Journal Carbon*, Vol. 20, p. 445 a graphitic carbon embraces the varieties of substances consisting of elemental carbon in allotropic form of graphite irrespective of of structural defects. The term graphitic carbon as used herein shall be construed in this manner.

The term carbon fibers shall mean elongated strands of carbon having length to diameter ratio greater than 4, typically greater than 8. The length to diameter ratio of carbon fibers can be much higher, for example, greater than 100 or more. The term "natural crystalline graphite" as used herein shall mean graphite that is minimally processed, i.e., essentially in its geologically occurring natural crystalline form. The term "synthetic graphite" as used herein shall mean synthetically prepared or processed graphite. The term "synthetic graphite" as used herein unless further qualified is also intended to include expanded forms of graphite (including expanded graphite that has been exfoliated) and graphitic carbon nanofibers. The term "expanded graphite" is a recognized term of art, for example, the form of graphite generally as referenced in U.S. Pat. No. 5,482,798. The expanded graphite is preferably in particulate form having a mean average particle size desirably between about 0.5 micron and 50 micron, typically between about 10 micron and 50 micron. Further, expanded graphite as used herein can be formed from natural and/or synthetic non-expanded graphite particles processed so as to have a uniaxially expanded crystal lattice. The extent of uniaxial expansion can be sufficiently large such that the expanded graphite particles can completely exfoliate (i.e., separate into thin laminae). The term "flaky" as commonly used in connection with graphites, (i.e., natural or synthetic flaky graphites) is intended to reflect that such graphites have a plate-like, non-expanded particle form.

It has been determined that use of graphitic carbon nanofibers in the cathode mixture of the invention employing copper oxide or copper hydroxide, is particularly useful. The addition of the graphitic carbon nanofibers has a very significant effect in raising the running voltage of the cell and significantly increases the useful life of the cell. The graphitic carbon nanofibers can desirably be added in amount between about 3 and 10 percent by weight, preferably 4 to 10 percent by weight of the cathode mixture. Such carbon nanofibers can serve as the only graphite conductive material for the cathode or it can be admixed in the above amount or smaller amount with other graphite materials such as natural graphites and. Such graphitic carbon nanofibers, per se, are referenced in the published art and specific methods of manufacture are disclosed, for example, in U.S. Pat. Nos. 5,594,060; 5,846,509 and 6,156,256.

The term graphitic carbon fibers as used herein shall mean carbon fibers having a graphitic carbon structure as defined by the International Committee for Characterization and Terminology of Carbon (ICCTC, 1982), published in the *Journal Carbon*, Vol. 20, p. 445. The graphitic carbon nanofibers as used herein shall mean graphitic carbon fibers having a mean average diameter less than 1000 nanometers (less than $1000 \times 10^{-9}$ meters). Preferably, the graphitic carbon nanofibers have a mean average diameter less than 500 nanometer, more preferably less than 300 nanometers. Desirably the graphitic carbon nanofibers have a mean average diameter between about 50 and 300 nanometers, typically between about 50 and 250 nanometers. The graphitic carbon nanofiber useful in the cathode mixture 812 of the invention has a mean average diameter desirably less than about 300 nanometers, preferably between about 50 and 250 nanometers, typically about 200 nanometers. The mean average length of the carbon nanofibers is desirably between about 0.5 and 300 micron, typically about 200 micron. The graphitic carbon nanofibers can have a BET surface area between about 15 and 50 $m^2/g$, typically between 15 and 30 $m^2/g$.

A preferred graphitic carbon nanofiber for use in the cathode mixture 812 of the invention is a vapor grown graphitic carbon fiber available under the trade designation PR19HT carbon fibers from Applied Sciences, Cedarville, Ohio. Such graphitic carbon nanofibers can be made by hydrocarbon vapor pyrolysis methods described, for example, in Applied Sciences U.S. Pat. No. 6,156,256; U.S. Pat. No. 5,846,509; and U.S. Pat. No. 5,594,060 herein incorporated by reference. The resulting carbon nanofibers have a graphitic carbon structure as defined in International Committee for Characterization and Terminology of Carbon (ICCTC, 1982), published in the *Journal Carbon*, Vol. 20, p. 445. The vapor grown carbon fibers described in the above patent references are graphitic carbon fibers which can be made by the pyrolysis of hydrocarbon, for example, methane in a gas phase reaction at temperatures of around 1000° C. or higher. The gas phase reaction involving the hydrocarbon is carried out upon contact with metal particles, typically iron particles in a nonoxidizing gas stream. The iron particles catalyze the growth of very thin individual carbon fibers (e.g. carbon nanofibers) which have a graphitic carbon structure. The resulting carbon fibers can have a very thin diameter (nanofibers), for example, between 50 and 300 nanometers such as that available under the trade designation PR19HT graphitic carbon nanofibers (Applied Sciences).

A specific method of forming such graphitic carbon nanofibers is described, for example, in U.S. Pat. No. 6,156,256 as follows: The process includes the steps of providing in a reactor a first catalyst preferably in the form of solid particles having a size from 10 nanometers to 1000 nanometers, which is used to initiate the formation of the nanofibers. The first catalyst in the form of solid particles can be an iron catalyst, desirably iron sulfide. Other materials which can be used as solid particles for the first catalyst are listed in U.S. Pat. No. 6,156,256 as iron, nickel, cobalt, ferrocene, alloys of iron, alloys of nickel, alloys of cobalt, sulfur, iron sulfide, and nickel nitrate. A vacuum is applied to the reactor to create reduced pressure in the reactor. A carbon-based gas is introduced into the reactor. The carbon-based gas is a gas which forms carbon and hydrogen free-radical species upon pyrolysis. The carbon based gas as stated in U.S. Pat. No. 6,156,256 is desirably methane. However, as stated in this reference it can also be carbon dioxide, methane, ethane, propane, ethene, natural gas, and coal derivative gases and mixtures thereof. The reaction gas mixture desirably also comprises hydrogen. The hydrogen is provided to inhibit pyrolytic fattening of the nanofibers and to inhibit the formation of soot during the pyrolysis reaction. As indicated in U.S. Pat. No. 6,156,256 the reaction gas mixture used to form the nanofibers desirably comprises from 40 to 90 percent of hydrogen gas and from 10 to 60% of the carbon based gas, desirably a 50—50 mixture of the carbon based gas and hydrogen. As described in U.S. Pat. No. 6,156,256 a second growth catalyst may be used in admixture with the carbon-based gas and hydrogen gas. The second catalyst promotes diametric growth (growth of diameter) of the nanofibers. As stated in this reference the second catalyst is desirably ammonia. However, it may include hydrogen and ammonia and mixtures thereof.

To form the nanofibers the above gases are introduced into the reactor. Formation of the fibers can be carried out at reduced pressure of from about 10 to 100 Torr, desirably from about 20 to 50 Torr. The mixture of gases can be formed into a plasma by means of a plasma generating source preferably a microwave generator, but may also be a hot filament, radio frequency (RF) generator, or by an electrical discharge generator. When the first catalyst is formed of the above described solid particles they are desirably supported on a substrate such as an inert dielectric material such as quartz, ceramic and refractory materials, preferably ceramic material which can be placed within the reactor, desirably within the reactor feed inlet. The reactor itself is constructed of materials which are resistient to heat and corrosion, for example nickel, high temperatre steel, quartz, ceramic, and refractory material. Power is turned on and the reactor heated. The mixture of gases is then formed into a plasma within the reactor at above described reduced pressure and at a catalyst substrate temperature of about 800° C. to 1200° C., desirably a temperature between about 800° C. and 1000° C. The gas rate can typically be between 20 and 1000 scfm (standard cubic feet per minute), desirably about 100 scfm. If a microwave power source is used, the latter reference describes generating between about 600 and 1200 Watts of power to convert the carbon-based gas to gas plasma catalyzed by the above mentioned solid catalyst. The plasma gas contains carbon free-radicals, hydrogen free radicals, and oxygen free-radicals. The carbon is captured by the catalyst to form the graphitic carbon nanofibers. The power supply is discontinued once the desired amount of nanofibers are formed. In another approach as described in U.S. Pat. No. 6,156,256 the first catalyst can be in a gaseous state instead of being provided in the form of solid particles. Suitable gaseous catalysts are described as being selected from iron pentacarbonyl, hydrogen sulfide, and a ferrocene-xylene mixture. If such gaseous catalyst is employed, it may be supplied in combination with the carbon-based gas and hydrogen mixture. In this embodiment the graphitic carbon nanofibers can be produced in steady state and collected as they are formed.

The graphitic carbon nanofibers contain impurities which are residual amount of the catalyst, typically iron or iron compound (or other metal or material above described), which were used to catalyze the gas phase reaction. It has been determined by Applicants herein that if such impurities are removed, a highly desirable conductive carbon nanofiber is obtained. Such purified graphitic carbon nanofiber can be added advantageously in nominal amount (e.g. 3 to 10 percent by weight) to cathode active material such as copper oxide or copper hydroxide. The addition of the purified graphitic carbon nanofibers to alkaline cell cathode mixtures comprising copper oxide or copper hydroxide, improves the cathode electrical conductivity very significantly. It is not known with certainty why this occurs. The very thin graphitic carbon nanofibers fibers appear to increase the number of electrical contact points and conductive pathways between the individual copper oxide or copper hydroxide particles more than the same percent by weight of conventional graphites. The tendency of the graphitic carbon nanofiber to attach to the copper oxide or copper hydroxide particles may be another favorable factor. This in turn causes the cathode to become more conductive and improves cell performance.

It has been determined that the iron (or other metal) impurity which are residual catalyst impurities imbedded in the graphitic carbon nanofiber can be readily removed therefrom by subjecting the nanofibers to heating at temperatures between about 2500° C. and 3100° C. after the fibers have been formed. Such heating vaporizes the metal impurities and can also serve to further graphitize the carbon fiber, particularly the surface of the fibers. The end result is a purified graphitic carbon nanofiber desirably contains less than 200 ppm, preferably less than 100 ppm, more preferably less than 50 ppm metal. (The term "metal" shall include all metal whether in elemental, ionic or chemically bound in compounds. PPM is parts by weight metal per million parts by weight carbon in the carbon fibers.) In particular the iron content in the graphitic carbon nanofibers is below the above stated cutoff amounts in ppm. Such graphitic carbon nanofiber when added in amount, for example, between about 3 and 10 percent by weight, preferably between about 4 and 10 percent by weight of cathodes comprising highly resistant copper oxide or copper hydroxide cathode active material, can very significantly lower the resistivity of the cathode. This in turn can make such cathodes very suitable for use in alkaline cells, particularly alkaline cells having an anode comprising zinc and electrolyte comprising aqueous potassium hydroxide.

The cathode mixture 812 includes an aqueous KOH electrolyte solution and the mixture can be prepared wet, with aqueous KOH included before the mixture is inserted into the cell. For example, the casing 820 can be filled with the cathode mixture and the central portion of the cathode mixture can be excavated leaving the annular cathode 812 as shown in FIG. 1. The wet cathode mixture can be compacted while in the cell. Alternatively, the wet mixture can be compacted into disks 812a before insertion into the cell and then, optionally, additionally compacted while in the cell. Alternatively, the cathode mixture 812 can be prepared by first dry mixing the copper oxide or copper hydroxide, and graphitic carbon material. The dry mixture can be compacted into the cell casing 820 or can be compacted into disk shaped blocks 812a, which can be inserted into the cell in stacked arrangement. A separator sheet 890 can be placed against the inside surface of cathode disks 812a. Generally, separators conventionally used in zinc/$MnO_2$ alkaline cells can be used for separator 890 in the present cell 810 having a cathode 612 comprising copper oxide or copper hydroxide. Separator 890 can be of cellulosic film or a film formed of nonwoven material comprising polyvinylalcohol and rayon fibers. Separator 890 can be of a single layer of such nonwoven material or can be a composite having an outer layer of cellophane adhered to the nonwoven material. The nonwoven material can typically contain between about 60 weight percent to 80 weight percent poyvinylalcohol fibers and between about 20 and 40 weight percent rayon fibers. Separator 890 can be positioned so that the cellophane layer is adjacent either cathode 812 or anode 815. The above described separators are known and have been used in connection with conventional zinc/$MnO_2$ alkaline cell and are also suitable for use in the present alkaline cell 810. Aqueous KOH electrolyte can be poured over the dry cathode wherein it becomes absorbed into the separator and cathode. The anode material 815 can then be added to the cell.

The copper oxide for use in cathode 812 is a powder having an average particle size (dry) desirably between about 1 and 100 micron, typically about 10 micron. The copper oxide has a purity greater than 99 percent by weight, preferably between about 99 and 99.8 percent by weight. The copper oxide has a real density of about 6.4 g/. The real density of a solid is the weight of the sample divided by the real volume. The real volume of a sample is the actual volume less volume occupied by entrapped air between the particles and pores within the particles. The BET surface area ($m^2$/g) (Brunauer, Emmett and Taylor method) is the standard measurement of particulate surface area by gas (nitrogen and/or other gasses) porosimetry as is recognized in the art. The BET surface area measures the total surface area on the exterior surface of the particle and also that portion of surface area defined by the open pores within the particle available for gas adsorption and deadsorption when applied. BET surface area determinations as reported herein is carried out in accordance with ASTM Standard Test Method D4820-99.

Anode 815 comprises zinc and aqueous KOH electrolyte. The electrolyte in the anode comprises a conventional mixture of KOH, ZnO and gelling agent. The zinc serves as the anode active material. The anode and cathode can be separated by a conventional ion porous separator 890, for example, comprising polyvinylalcohol and cellulosic fibrous material. After cell 810 is filled an insulating plug 860 is inserted into open end 816. Insulating plug 860 may be of polypropylene, talc filled polypropylene, sulfonated polyethylene or nylon. Plug 860 can have a thinned portion 865 therein typically of a small circular, oval or polygonal shape. Thinned portion 865 functions as a rupturable membrane which can be designed to rupture thereby releasing excessive gas within the cell. This guards against excessive buildup of gas pressure within the cell, for example, if the cell is subjected to excessive heat or abusive operating conditions. The plug 860 is preferably snap fitted around circumferential step 818 as shown in the figure so that the plug locks in place into the open end 816. The peripheral edge 827 of casing 820 is crimped over the top of insulating plug 860. A paper insulating washer 880 is applied over the crimped peripheral edge 827 of casing 820. Insulating washer 880 can be a polyethylene coated paper washer. A terminal end cap 830 is welded to the head of current collector 840. An elongated current collector 840 is then inserted (force fitted) into aperture 844 of insulating plug 860 so that end cap 830 comes to rest against insulating washer 880. Current collector 840 can be selected from a variety of known electrically conductive metals found to be useful as current collector materials, for example, brass, tin plated brass, bronze, copper or indium plated brass. The current collector 840 used in the test cells was of brass. Conventional asphalt sealant may be preapplied around the current collector 840 before it is inserted into aperture 844. A film label 870 is applied around casing 820. The terminal end cap 830 becomes the negative terminal of alkaline cell 810 and pip 825 at the closed end of casing 820 becomes the positive terminal.

The cell 810 shown in FIG. 1 can be an AA cell. However, the alkaline cell shown in the figure is not intended to be restricted to any particular size. Thus, the present invention is applicable to AAAA, AAA, C and D size cylindrical alkaline cells as well as button size alkaline cells of any size or shape. Alkaline cell 810 is not intended to be restricted to any particular alkaline cell chemistry or cell size, except that the cathode 812 is prepared utilizing the cathode mixtures of invention employing copper oxide or copper hydroxide cathode active material and a graphitic carbon additive, preferably expanded graphite or graphitic carbon nanofibers or any mixture thereof. The above cell (FIG. 1) can be an AAAA, AAA, AA, C or D cells. These standard cell sizes are recognized in the art and are set by the American National standards Association or in Europe by the International Electrotechnical Commission (IEC). The AA cylindrical cell as referenced herein had standard overall dimensions as given by the American National Standards Institute (ANSI) battery specification ANSI C18.1M, Part 1-1999 as follows: The overall length from positive and negative terminal tips is between 49.2 mm and 50.5 mm and overall outside cell diameter is between 13.5 mm and 14.5 mm.

Thus cell 810 can contain conventional alkaline cell anode chemistries including those which contain zero added mercury (less than 50 parts mercury per million parts total cell weight, preferably less than 10 parts mercury per million parts total cell weight) and modifications thereof. Such representative chemistries, for example, are disclosed in U.S. Patent No. 5,401,590, herein incorporated by reference. The cell 810 of the invention also preferably does not contain added amounts of lead and thus can be essentially lead free, that is, the total lead content is less than 30 ppm, desirably less than 15 ppm of total metal content of the anode.

Figure 2:
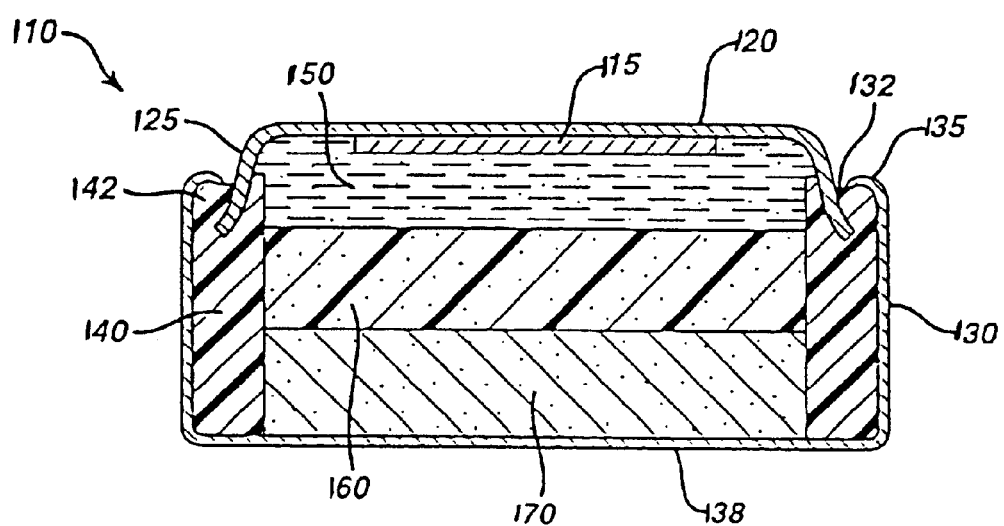
FIG. 2 is a cross sectional view of a cylindrical button alkaline cell having the cathode of the invention.

A zinc/manganese dioxide alkaline cell also can be fabricated in the form of a button or coin cell 110 as shown in FIG. 2. The cell 110 can include a cathode 170 comprising the cathode mixture of the invention. Such cathode mixtures, for example, can comprise copper oxide, 80 to 92 wt. %, graphitic carbon, preferably expanded or graphitic carbon nanofibers between about 4 and 10 wt. %, and between about 5 and 10 wt. % of aqueous KOH electrolyte (aqueous KOH electrolyte is 30 to 40 wt. % KOH concentration, preferably between 35 and 40 wt. % KOH concentration). The aqueous KOH electrolyte preferably also contains about 2 wt. % ZnO. The cathode mixture can optionally also comprise between about 0.1 to 0.5 wt % of a polyethylene binder. The addition of expanded graphitic carbon nanofibers in amount between about 3 and 10 percent by weight, preferably between about 4 and 8 percent by weight of the allows cathodes having a high loading of copper oxide, e.g. between about 80 and 92 percent by weight copper oxide, to be used successfully in alkaline cells.

The anode material 150 comprises: Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the tradename "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is between about 69.2 and 75.5 percent by volume of the anode. It shall be understood that the term zinc as used herein shall include such zinc alloy powder, since the alloy powder is composed almost entirely of zinc and functions electrochemically as zinc.

The separator 160 can be a conventional ion porous separator as described above with respect to separator 890. In the specific embodiment shown in FIG. 2, referenced in the examples, the separator 160 comprises an outer layer of cellulose and an inner layer of a nonwoven material composed of cellulosic (rayon) and polyvinylalcohol fibers. Separator 160 is positioned so the outer layer of cellulose abuts the cathode 170. In the button cell 110 shown in FIG. 2, a disk-shaped cylindrical housing 130 is formed having an open end 132 and a closed end 138. Housing 130 is formed from nickel-plated steel. An electrical insulating member 140, preferably a cylindrical member having a hollow core, is inserted into housing 130 so that the outside surface of insulating member 140 abuts and lines the inside surface of housing 130. Alternatively, the inside surface of housing 130 can be coated with a polymeric material that solidifies into insulator 140 abutting the inside surface housing 130. Insulator 140 can be formed from a variety of thermally stable insulating materials, for example, nylon or polypropylene.

The cathode mixture 170 comprising copper oxide or copper hydroxide, graphitic carbon, preferably comprising expanded graphite or graphitic carbon nanofibers, and mixtures thereof, and aqueous electrolyte can be prepared by simple mixing at ambient temperature in a conventional blender until a homogenous mixture is obtained. The cathode 170 is applied as a layer or a pressed disk abutting the inside surface of the closed end 138 of housing 130. The separator sheet 160 is placed overlying cathode 170. Additional aqueous electrolyte can be added so that electrolyte fully penetrates through separator sheet 160 and cathode 170. A layer of anode mixture 150 comprising particulate zinc, aqueous KOH electrolyte solution (35–40 wt % KOH and 2 wt. % ZnO), and gelling agent is applied to the separator sheet 160. The anode cover 120, formed preferably of nickel-plated steel, is inserted into the open end 132 of housing 130. An anode current collector 115 comprising a sheet of brass, tin-plated brass, bronze, copper or indium-plated brass can optionally be welded to the inside surface of anode cover 120. Peripheral edge 135 of housing 130 is crimped over the exposed insulator edge 142 of insulating member 140. The peripheral edge 135 bites into insulator edge 142 closing housing 130 and tightly sealing the cell contents therein. The anode cover 120 also functions as the negative terminal of the cell and the housing 130 at the closed end 138 functions as the cell's positive terminal.

Test cylindrical button cells 110 had a diameter of 15.0 mm and depth of about 8.2 mm.

The separator 160 was a conventional ion porous separator consisting of an inner layer of a nonwoven material of cellulosic (rayon) and polyvinylalcohol fibers and an outer layer of cellophane. The same anode mixture comprising particulate zinc was used in each test cell. The cathode composition was varied as indicated in following examples. The performance of the cells, service life (milliamp-hrs) and energy output (milliwatt-hrs) at low rate was determined by discharging at 22 milliAmp to a cut off voltage of 0.1 Volts.

In the case of the comparative test (Examples 1A–1C) using an anode comprising zinc and a cathode comprising $MnO_2$, the cells 110 and 810 were balanced on the basis that milliamp-hrs capacity of zinc (based on 820 milliamp-hours per gram zinc) divided by the milliamp-hrs capacity of $MnO_2$ (based on 308 milliamp-hours per gram $MnO_2$) is above about 1.0. This assures that cell discharge is limited by the cathode. In the cells tested (Examples 2A–2C) using an anode comprising zinc and cathode comprising copper oxide the cells 110 and 810 were balanced on the basis that the milliamp-hrs capacity of zinc (based on 820 milliamp-hours per gram zinc) divided by the milliamp-hrs capacity of copper oxide (based on 674 milliAmp-hours per gram copper oxide) is above about 1.0. In the cells tested (Examples 3A–3C) using an anode comprising zinc and cathode comprising copper hydroxide the cells 110 and 820 were balanced on the basis that the milliAmp-hrs capacity of zinc (based on 820 milliAmp-hours per gram zinc) divided by the milliAmp-hrs capacity of copper hydroxide (based on 549 milliAmp-hours per gram copper hydroxide) is above about 1.0.

EXAMPLE 1A

Comparative—Zinc Anode; MnO2 Cathode with Natural Graphite

Test cylindrical cells 110 were prepared. The cell 10 had an overall dimension of about 15 mm diameter and depth of about 8.2 mm. The total internal volume of cell 110 available for cathode 170 and anode 150 was about 1.2 cubic centimeters. Test cells 110 were prepared with a anode 150 comprising Zinc alloy powder 62 to 69 wt % (99.9 wt % zinc containing indium), an aqueous KOH solution comprising 38 wt % KOH and about 2 wt % ZnO; a cross-linked acrylic acid polymer gelling agent available commercially under the trade name "CARBOPOL C940" from B. F. Goodrich (e.g., 0.5 to 2 wt %) and a hydrolyzed polyacrylonitrile grafted onto a starch backbone commercially available commercially under the tradename "Waterlock A-221" from Grain Processing Co. (between 0.01 and 0.5 wt. %); dionyl phenol phosphate ester surfactant available commercially under the tradename "RM-510" from Rhone-Poulenc (50 ppm). The zinc alloy average particle size is desirably between about 30 and 350 micron. The bulk density of the zinc in the anode is between about 1.75 and 2.2 grams zinc per cubic centimeter of anode. The percent by volume of the aqueous electrolyte solution in the anode is between about 69.2 and 75.5 percent by volume of the anode.

The cathode 170 can have the following representative composition: 80–87 wt % of electrolytic manganese dioxide (e.g., Trona D from Kerr-McGee), 4–10 wt % graphite (e.g. natural graphite NdG-15 from Nacional de Graphite, Brazil, BET surface of 8.1 $m^2/g$), 5–10 wt % of an aqueous KOH solution having a KOH concentration of about 35–40 wt. %, and optionally 0.1–0.5 wt. % of a polyethylene binder such as Coathylene binder from Hoechst Celanese. The cathode 170 had 0.54 grams of $MnO_2$ and was balanced as above described. The amount of zinc in anode 150 was in some excess to make the cell discharge cathode limited. A specific cathode composition which was used for Example 1A is as follows:

| | Cathode Composition[1] | |
|---|---|---|
| | Wt. % | Vol. % |
| $MnO_2$ (EMD) (Trona D) | 87.6 | 72.20 |
| Natural graphite[2] (NdG-15) | 5.5 | 9.00 |
| KOH aqueous Solution (38 wt % KOH and 2 wt % ZnO) | 6.5 | 17.50 |
| Polyethylene Binder | 0.4 | 1.30 |
| | 100.0 | 100.00 |

Notes:
[1] The wt. % values have been converted from vol. % using the following real densities: $MnO_2$ (EMD), 4.45 g/cc; natural graphite (2.25 g/cc); and 38 wt % KOH aqueous solution (1.37 g/cc).
[2] Natural graphite Ndg-15 from Nacional de Graphite, Brazil.

The cell 110 was discharged at a constant rate of 22 milliAmp to a cut off voltage of 0.1 volts. The 22 milliAmp discharge for this cell is equivalent to a current density of about 21 milliAmp/$cm^2$ based on the anode/cathode interface, approximately equivalent to a 250 milliAmp constant discharge rate for a AA size cell as in FIG. 2. The cell had a time averaged running voltage of about 0.91 volts. The capacity obtained at the above cut off voltage was 161 milliAmp-hrs. Specific capacity of the $MnO_2$ is 782 milliAmp-hrs per cubic centimeter of total cathode volume (292 milliAmp-hrs per gram $MnO_2$). The energy output of the cell was 147 milliWatt-hrs. The energy output of the cathode is 715 milliWatt-hrs per cubic centimeter. The cathode 170 had a resistivity of 0.335 ohm-meters.

EXAMPLE 1B

Comparative Zn Anode; MnO2 Cathode with Expanded Graphite

The same cell as in Example 1A was prepared except that the natural graphite in the cathode was replaced with expanded graphite. The cathode composition was as follows:

| | Cathode Composition[1] | |
|---|---|---|
| | Wt. % | Vol. % |
| $MnO_2$ (EMD) (Trona D) | 87.6 | 72.2 |
| Expanded graphite[2] (WH20) | 5.5 | 9.0 |
| KOH aqueous Solution (38 wt % KOH and 2 wt % ZnO) | 6.5 | 17.5 |
| Polyethylene Binder | 0.4 | 1.3 |
| | 100.0 | 100.00 |

Notes:
[1] The wt. % values have been converted from vol. % using the following real densities: $MnO_2$ (EMD), 4.45 g/cc; natural graphite (2.25 g/cc); and 38 wt % KOH aqueous solution (1.37 g/cc).
[2] Expanded graphite WH20 from Chuetsu Company.

The cell 110 is discharged at a constant rate of 22 milliAmp to a cut off voltage of 0.1 volts. This is equivalent to a current density of about 21 milliAmp/$cm^2$ based on the anode/cathode interface, approximately equivalent to a constant current discharge of about 250 milliAmp in a AA size cell as in FIG. 2. The cell had a time averaged running voltage of about 1.01 volts. The capacity obtained at the above cut off voltage was 156 milliAmp-hrs. The specific capacity of the $MnO_2$ was 792 milliAmp-hours per cubic centimeter of total cathode volume(289 milliAmp-hrs per gram $MnO_2$). The energy output of the cell was 158 milliWatt-hrs. The resistivity of cathode 170 was 0.075 ohm-meter.

EXAMPLE 1C

Comparative Zn Anode; MnO2 Cathode with Graphitic Carbon Nanofibers

The same cell as in Example 1A was prepared except that the natural graphite in the cathode was replaced with graphitic carbon nanofibers. The cathode composition was as follows:

|  | Cathode Composition[1] | |
|---|---|---|
|  | Wt. % | Vol. % |
| $MnO_2$ (EMD) (Trona D) | 87.6 | 72.20 |
| carbon nanofibers[2] (NdG-15) | 5.5 | 9.00 |
| KOH aqueous Solution (38 wt % KOH and 2 wt % ZnO) | 6.5 | 17.50 |
| Polyethylene | 0.4 | 1.30 |
| Binder |  |  |
|  | 100.0 | 100.00 |

Notes:
[1]The wt. % values have been converted from vol. % using the following real densities: $MnO_2$ (EMD), 4.45 g/cc; natural graphite (2.25 g/cc); and 38 wt % KOH aqueous solution (1.37 g/cc).
[2]Graphitic carbon nanofiber from Applied Sciences, Cedarville, Ohio., post heat treated at temperatures of between about 2500° C. and 3100° C. The fibers had an average diameter of 200 nanometer and average length of 200 micron.

The cell 110 was discharged at a constant rate of 22 milliAmp to a cut off voltage of 0.1 volts. This rate is equivalent to a current density of about 21 milliAmp/cm² based on the anode/cathode interface, approximately equivalent to a discharge rate of 250 milliAmp for an AA size cell as in FIG. 2. The cell had a time averaged running voltage of about 1.01 volts. The capacity obtained at the above cut off voltage was 155 milliAmp-hrs. Specific capacity of the $MnO_2$ was 814 milliAmp-hrs per cubic centimeter of cathode (286 milliAmp-hrs per gram $MnO_2$). The energy output of the cell was 157 milliWatt-hrs. The resistivity of cathode 170 was 0.022 ohm-meters.

The cell performance of Examples 1A–1C is summarized in Table 1.

EXAMPLE 2A

Zn Anode; Copper Oxide Cathode with Natural Graphite

Test cell 110 was prepared as in Example 1A except that the cathode 170 is formed of the following cathode mixture of the invention comprising copper oxide (CuO). The CuO was ACS (American Chemical Society) grade at 99.5 wt. % purity obtained from Fisher Scientific Company. Graphitic material in the form of natural graphite, NdG-15 from Nacional De Graphite, Brazil was added as in Example 1A. The cathode 170 had 0.78 grams of copper oxide and was balanced with zinc in excess in anode 150 as above described. Cathode 170 had the following composition.

|  | Cathode Composition[1] | |
|---|---|---|
|  | Wt. % | Vol. % |
| CuO | 91.0 | 72.2 |
| Natural graphite[2] (NdG-15) | 4.0 | 9.0 |
| KOH aqueous Solution (38 wt % KOH and 2 wt. % ZnO) | 4.7 | 17.5 |
| Polyethylene | 0.3 | 1.3 |
| Binder |  |  |
|  | 100.00 | 100.00 |

Notes:
[1]The wt. % values have been converted from vol. % using the following real densities: CuO, 6.4 g/cc; natural graphite, (2.25 g/cc); and 38 wt % KOH aqueous solution (1.37 g/cc).
[2]Natural graphite Ndg-15 from Nacional de Graphite, Brazil.

The cell 110 was discharged at a constant rate of 22 milliAmp to a cut off voltage of 0.1 volts. The 22 milliAmp discharge for this cell (current density of about 21 milliAmp/cm²) is approximately equivalent to a 250 milliAmp discharge rate for a AA size cell as in FIG. 2. The cell had a time averaged running voltage of about 0.74 volts. The capacity obtained at the above cut off voltage was 506 milliAmp-hrs. The specific capacity of the copper oxide was was 253 milliAmp-hours per cubic centimeter total cathode volume (661 milliAmp-hrs per gram copper oxide). The energy output of the cell was 373 milliWatt-hrs. The cathode had a resistivity of 0.344 ohm-meter.

EXAMPLE 2B

Zn Anode; Copper Oxide Cathode with Expanded Graphite

Test cell 110 is prepared as in Example 1B except that the cathode 170 is formed of the following cathode mixture of the invention comprising copper oxide (CuO). The CuO was ACS (American Chemical Society) grade at 99.5 wt. % purity obtained from Fisher Scientific Company. Graphite material in the form of expanded graphite, WH20 from Chuetsu Company was added as in Example 1B. The cathode 170 had 0.78 grams of copper oxide and was balanced with zinc in excess in anode 150 as above described.

|  | Cathode Composition[1] | |
|---|---|---|
|  | Wt. % | Vol. % |
| CuO | 91.0 | 72.2 |
| Expanded graphite[2] (WH20) | 4.0 | 9.0 |

-continued

| | Cathode Composition[1] | |
|---|---|---|
| | Wt. % | Vol. % |
| KOH aqueous Solution (38 wt % KOH and 2 wt. % ZnO) | 4.7 | 17.5 |
| Polyethylene Binder | 0.3 | 1.3 |
| | 100.00 | 100.00 |

Notes:
[1]The wt. % values have been converted from vol. % using the following real densities: CuO, 6.4 g/cc; expanded graphite, (2.25 g/cc); and 38 wt % KOH aqueous solution (1.37 g/cc).
[2]Expanded graphite WH20 from Chuetsu Company.

The cell 110 was discharged at a constant rate of 22 milliAmp to a cut off voltage of 0.1 volts. This is equivalent to a current density of about 21 milliAmp/cm$^2$, approximately equal to constant current discharge of about 250 milliAmp in a AA size cell as in FIG. 2. The cell had a time averaged running voltage of about 0.74 volts. The capacity obtained at the above cut off voltage was 518 milliAmp-hrs. The specific capacity of the copper oxide was 2363 milli-Amp per cubic centimeter total cathode volume (657 milli-Amp per gram copper oxide). The energy output of the cell was 383 milliWatt-hrs. The resistivity of cathode 170 was 0.054 ohm-meters.

EXAMPLE 2C

Zn Anode; Copper Oxide Cathode with Graphitic Carbon Nanofibers

Test cell 110 was prepared as in Example 1C except that the cathode 170 was formed of the following cathode mixture of the invention comprising copper oxide (CuO). The CuO was ACS (American Chemical Society) grade at 99.5 wt. % purity obtained from Fisher Scientific Company. Graphitic material in the form of graphitic carbon nanofibers PR19HT (200 nanometer diameter and 200 micron length) from Applied Sciences was added as in Example 1C. The cathode 170 has 0.78 grams copper oxide and is balanced with an amount of zinc in anode 150 in excess as above described.

| | Cathode Composition[1] | |
|---|---|---|
| | Wt. % | Vol. % |
| CuO | 91.0 | 72.2 |
| Carbon nanofibers[2] (PR19HT) | 4.0 | 9.0 |

-continued

| | Cathode Composition[1] | |
|---|---|---|
| | Wt. % | Vol. % |
| KOH aqueous Solution (38 wt % KOH and 2 wt. % ZnO) | 4.7 | 17.5 |
| Polyethylene Binder | 0.3 | 1.3 |
| | 100.00 | 100.00 |

Notes:
[1]The wt. % values have been converted from vol. % using the following real densities: CuO 6.4 g/cc; graphitic carbon nanofibers PR19HT from Applied Sciences, (2.25 g/cc); and KOH aqueous solution (1.37 g/cc), polyethylene binder is 1.0 g/cc.
[2]Graphitic carbon nanofiber from Applied Sciences, Cedarville, Ohio, post heat treated at temperature between about 2500° C. and 3100° C. The fibers had an average diameter of 200 nanometer and average length of 200 micron.

The cell 110 is discharged at a constant rate of 22 milliAmp to a cut off voltage of 0.1 volts. This is equivalent to a current density of about 21 milliAmp/cm$^2$ based on the anode/cathode interface, approximately equal to a current drain of about 250 milliAmp for a AA size cell as in FIG. 2. The cell had a time averaged running voltage of about 0.75 volts. The capacity obtained at the above cut off voltage was 514 milliAmp-hrs. The specific capacity of the copper oxide was 257 milliAmp-hours per cubic centimeter total cathode volume (639 milliAmp-hours per gram copper oxide.) The energy output of the cell was 387 milliWatt-hours. The cathode 170 had a resistivity of 0.054 ohm-meters.

The cell performance of Examples 2A–2C is summarized in Table 2.

EXAMPLE 3A

Zn Anode: Copper Hydroxide Cathode with Natural Graphite

Test cell 110 was prepared as in Example 1A except that the cathode 170 is formed of the following cathode mixture embodiment comprising resistive copper hydroxide Cu(OH)$_2$. Graphite material in the form of natural graphite was added as in Example 1A. The cathode 170 had 0.42 grams of copper hydroxide and was balanced with zinc in excess in anode 150 as above described.

| | Cathode Composition[1] | |
|---|---|---|
| | Wt. % | Vol. % |
| Cu(OH)$_2$ | 84.2 | 72.2 |
| Natural Graphite[2] (NdG-15) | 7.0 | 9.0 |

-continued

| | Cathode Composition[1] | |
|---|---|---|
| | Wt. % | Vol. % |
| KOH aqueous Solution (38 wt % KOH and 2 wt. % ZnO) | 8.3 | 17.5 |
| Polyethylene Binder | 0.5 | 1.30 |
| | 100.0 | 100.0 |

Notes:
[1]The wt. % values have been converted from vol. % using the following real densities: $Cu(OH)_2$, 3.37 g/cc; natural graphite (2.25 g/cc); and 38 wt % KOH aqueous solution (1.37 g/cc); polyethylene binder, 1.0. The $Cu(OH)_2$ was resistive copper hydroxide from Aldrich Chemical Co., Inc. Catalog #28,978.7 (assay less than 92 wt. % copper hydroxide).
[2]Natural graphite Ndg-15 from Nacional de Graphite, Brazil.

The cell 110 is discharged at a constant rate of 22 milliAmp to a cut off voltage of 0.1 volts. This is equivalent to a current density of about 21 milliAmp/cm², approximately equivalent to a current drain of about 250 milliAmp in a AA size cell as in FIG. 2. The cell had a time averaged running voltage of about 0.64 volts. The capacity obtained at this cut off voltage was 212 milliAmp-hrs. The specific capacity of the copper hydroxide was 1,036 milliAmp per cubic centimeter total cathode volume (506 milliAmp-hours per gram copper hydroxide). The energy output of the cell was 136 milliWatt-hrs. The cathode 170 had a resistivity of 234 ohm-meters.

EXAMPLE 3B

Zn Anode: Copper Hydroxide Cathode with Expanded Graphite

Test cell 110 is prepared as in Example 1B except that the cathode 170 was formed of the following cathode mixture embodiment comprising resistive copper hydroxide $Cu(OH)_2$. Graphite material in the form of expanded graphite was added as in Example 1B. The cathode 170 had 0.42 grams of copper hydroxide and was balanced with zinc in anode 150 in excess as above described. The cathode 170 had the following composition:

| | Cathode Composition[1] | |
|---|---|---|
| | Wt. % | Vol. % |
| $Cu(OH)_2$ | 84.2 | 72.2 |
| Expanded graphite[2] (WH20) | 7.0 | 9.0 |
| KOH aqueous Solution (38 wt % KOH and 2 wt. % ZnO) | 8.3 | 17.5 |
| Polyethylene Binder | 0.5 | 1.30 |
| | 100.0 | 100.0 |

Notes:
[1]The wt. % values have been converted from vol. % using the following real densities: $Cu(OH)_2$, 3.37 g/cc; expanded graphite, (2.25 g/cc); and 38 wt % KOH aqueous solution (1.37 g/cc); polyethylene binder, 1.0. The $Cu(OH)_2$ was resistive copper hydroxide from Aldrich Chemical Co., Inc. Catalog #28,978.7 (assay less than 92 wt. % copper hydroxide).
[2]Expanded graphite WH20 from Chuetsu Company.

The cell 110 was discharged at a constant rate of 22 milliAmp to a cut off voltage of 0.1 volts. This is equivalent to a current density of about 21 milliAmp/cm² based on the anode/cathode interface, approximately equal to a constant current discharge of about 250 milliAmp in a AA size cell as in FIG. 2. The cell had a time averaged running voltage of about 0.62 volts. The capacity obtained at the above cut off voltage was 204 milliAmp-hrs. The specific capacity of the copper hydroxide was 978 milliAmp-hours per cubic centimeter total cathode volume (480 milliAmp-hours per gram copper hydroxide). The energy output of the cell was 126 milliWatt-hrs. The cathode 170 had a resistivity of 2.6 ohm-meters.

EXAMPLE 3C

Zn Anode; Copper Hydroxide Cathode with Graphitic Carbon Nanofibers

Test cell 110 was prepared as in example 1C except that the cathode 170 was formed of the following cathode mixture embodiment comprising resistive copper hydroxide $Cu(OH)_2$. Graphite material in the form of graphitic carbon nanofibers was added as in Example 1C. The cathode 170 had 0.42 grams of copper hydroxide and was balanced with zinc in anode 150 as above described. Cathode 170 had the following composition:

| | Cathode Composition[1] | |
|---|---|---|
| | Wt. % | Vol. % |
| $Cu(OH)_2$ | 84.2 | 72.2 |
| carbon nanofiber[2] (PR19HT from Applied Sciences) | 7.0 | 9.0 |
| KOH aqueous Solution (38 wt % KOH and 2 wt. % ZnO) | 8.3 | 17.5 |
| Polyethylene Binder | 0.5 | 1.3 |
| | 100.0 | 100.0 |

Notes:
[1]The wt. . % values have been converted from vol. % using the following real densities: $Cu(OH)_2$, 3.37 g/cc; graphitic carbon nanofiber, (2.25 g/cc); and 38 wt % KOH aqueous solution (1.38 g/cc). The $Cu(OH)_2$ was resistive copper hydroxide from Aldrich Chemical Co., Inc. Catalog #28,978.7 (assay less than 92 wt. % copper hydroxide).
[2]Graphitic carbon nanofiber from Applied Sciences, Cedarville, Ohio, post heat treated at temperatures between about 2500° C. and 3100° C. The fibers had an average diameter of 200 nanometer and average length of 200 micron.

The cell 110 is discharged at a constant rate of 22 milliAmp to a cut off voltage of 0.1 volts. This is equivalent to a current density of about 21 milliAmp/cm² based on the anode/cathode interface, approximately equal to a current drain of about 250 milliAmp in an AA size cell as in FIG. 2. The cell had a time averaged running voltage of about 0.62 Volts. The capacity obtained at the above cut off voltage was 209 milliAmp-hrs. The specific capacity of the copper hydroxide was 576 milliAmp-hours per cubic centimeter total cathode volume (501 milliAmp-hours per gram copper hydroxide). The energy output of the cell was 130 milliWatt-hrs. The cathode 170 had a resistivity of 1.03 ohm-meters.

The cell performance of Examples 3A–3C is summarized in Table 3.

EXAMPLE 4A

Zn Anode: Copper Hydroxide Cathode with Natural Graphite

Test cell 110 was prepared as in example 3A except that the cathode 170 is formed of the following cathode mixture embodiment comprising a less resistive copper hydroxide $Cu(OH)_2$. Graphite material in the form of natural graphite was added as in example 3A. The cathode 170 had 0.42 grams of copper hydroxide and was balanced with zinc in excess in anode 150 as above described.

|  | Cathode Composition[1] | |
| --- | --- | --- |
|  | Wt. % | Vol. % |
| $Cu(OH)_2$ | 84.2 | 72.2 |
| Natural Graphite[2] (NdG-15) | 7.0 | 9.0 |
| KOH aqueous Solution (38 wt % KOH and 2 wt. % ZnO) | 8.3 | 17.5 |
| Polyethylene Binder | 0.5 | 1.30 |
|  | 100.0 | 100.0 |

Notes:
[1]The wt. % values have been converted from vol. % using the following real densities: $Cu(OH)_2$, 3.37 g/cc; natural graphite, (2.25 g/cc); and 38 wt % KOH aqueous solution (1.37 g/cc); polyethylene binder, 1.0. . The $Cu(OH)_2$ was lower resistive copper hydroxide from Alfa Aesar Company, stock #32733 (assay 94 wt % purity copper hydroxide).
[2]Natural graphite Ndg-15 from Nacional de Graphite, Brazil.

The cell 110 was discharged at a constant rate of 22 milliAmp to a cut off voltage of 0.1 volts. This is equivalent to a current density of about 21 milliAmp/cm² based on the anode/cathode interface, approximately equivalent to a current drain of about 250 milliAmp in a AA size cell as in FIG. 2. The cell had a time averaged running voltage of about 0.71 volts. The capacity obtained at this cut off voltage was 226 milliAmp-hrs. The specific capacity of the copper hydroxide was 1,237 milliAmp per cubic centimeter total cathode volume (532 milliAmp-hours per gram copper hydroxide). The energy output of the cell was 160 milliWatt-hrs. The cathode 170 had a resistivity of 0.55 ohm-meters.

EXAMPLE 4B

Zn Anode: Copper Hydroxide Cathode with Expanded Graphite

Test cell 110 was prepared as in example 3B except that the cathode 170 was formed of the following cathode mixture embodiment comprising a less resistive copper hydroxide $Cu(OH)_2$. Graphite material in the form of expanded graphite was added as in Example 3B. The cathode 170 had 0.42 grams of copper hydroxide and was balanced with zinc in anode 150 in excess as above described. The cathode 170 had the following composition:

|  | Cathode Composition[1] | |
| --- | --- | --- |
|  | Wt. % | Vol. % |
| $Cu(OH)_2$ | 84.2 | 72.2 |
| Expanded graphite[2] (WH20) | 7.0 | 9.0 |
| KOH aqueous Solution (38 wt. % KOH and 2 wt. % ZnO) | 8.3 | 17.5 |
| Polyethylene Binder | 0.5 | 1.30 |
|  | 100.0 | 100.0 |

Notes:
[1]The wt. % values have been converted from vol. % using the following real densities: $Cu(OH)_2$, 3.37 g/cc; expanded graphite, (2.25 g/cc); and 38 wt. % KOH aqueous solution (1.37 g/cc); polyethylene binder, 1.0. The $Cu(OH)_2$ was lower resistive copper hydroxide from Alfa Aesar Company, stock #32733 (assay 94 wt. % purity copper hydroxide).
[2]Expanded graphite WH20 from Chuetsu Company.

The cell 110 was discharged at a constant rate of 22 milliAmp to a cut off voltage of 0.1 volts. This is equivalent to a current density of about 21 milliAmp/cm², approximately equal to a constant current discharge of about 250 milliAmp in a AA size cell as in FIG. 2. The cell had a time averaged running voltage of about 0.70 volts. The capacity obtained at the above cut off voltage was 229 milliAmp-hrs. The specific capacity of the copper hydroxide was 1262 milliAmp-hours per cubic centimeter total cathode volume (535 milliAmp-hours per gram copper hydroxide). The energy output of the cell was 160 milliWatt-hrs. The cathode 170 had a resistivity of 0.11 ohm-meters.

EXAMPLE 4C

Zn Anode; Copper Hydroxide Cathode with Graphitic Carbon Nanofibers

Test cell 110 was prepared as in Example 3C except that the cathode 170 is formed of the following cathode mixture embodiment comprising a less resisitve copper hydroxide $Cu(OH)_2$. The graphite material in the form of graphitic carbon nanofibers was added as in Example 3C. The cathode 170 had 0.42 grams of copper hydroxide and was balanced with zinc in anode 150 as above described. Cathode 170 had the following composition:

|  | Cathode Composition[1] | |
| --- | --- | --- |
|  | Wt. % | Vol. % |
| $Cu(OH)_2$ | 84.2 | 72.2 |
| carbon nanofiber[2] (PR19HT from Applied Sciences) | 7.0 | 9.0 |

-continued

| | Cathode Composition[1] | |
|---|---|---|
| | Wt. % | Vol. % |
| KOH aqueous Solution (38 wt % KOH and 2 wt. % ZnO) | 8.3 | 17.5 |
| Polyethylene Binder | 0.5 | 1.3 |
| | 100.0 | 100.0 |

Notes:
[1]The wt. % values have been converted from vol. % using the following real densities: $Cu(OH)_2$, 3.37 g/cc; graphitic carbon nanofiber, (2.25 g/cc); and 38 wt. % KOH aqueous solution (1.38 g/cc). The $Cu(OH)_2$ was lower resistive copper hydroxide from Alfa Aesar Company, stock #32733 (assay 94 wt % purity copper hydroxide).
[2]Graphitic carbon nanofiber from Applied Sciences, Cedarville, Ohio, post heat treated at temperatures between about 2500° C. and 3100° C. The fibers had an average diameter of 200 nanometer and average length of 200 micron.

The cell 110 was discharged at a constant rate of 22 milliAmp to a cut off voltage of 0.1 volts. This is equivalent to a current density of about 21 milliAmp/cm² based on the anode/cathode interface, approximately equivalent to a current drain of about 250 milliAmp in an AA size cell as in FIG. 2. The cell had a time averaged running voltage of about 0.75 Volts. The capacity obtained at the above cut off voltage was 219 milliAmp-hrs. The specific capacity of the copper hydroxide was 787 milliAmp-hours per cubic centimeter total cathode volume (523 milliAmp-hours per gram copper hydroxide). The energy output of the cell was 165 milliWatt-hrs. The cathode 170 had a resistivity of 0.038 ohm-meters.

The cell performance of Examples 4A–4C is summarized in the Table 4.

TABLE 1

| Cathode | Cathode resistivity ohm-meter | Percent Reduction in resistivity versus (Ex. 1A) cathode with natural graphite | Average Running Voltage (Volts) | Capacity mAmp-hr @ 22 mAmp discharge rate to 0.1 V cut off | Energy Output, mWatt-hour |
|---|---|---|---|---|---|
| Ex. 1A EMD and natural graphite (NdG15) | 0.335 | | 0.91 | 161 | 147 |
| Ex. 1B EMD and expanded graphite (WH20) | 0.075 | 77.6 | 1.01 | 156 | 158 |
| Ex. 1C EMD and carbon nanofibers (PR19HT) | 0.022 | 93.4 | 1.01 | 155 | 157 |

Notes:
1. The cathode mixtures were all at 72.2 vol % EMD active material with included aqueous KOH electrolyte as specified in the respective examples.

TABLE 2

| Cathode | Cathode resistivity ohm-meter | Percent Reduction in resistivity versus (Ex. 2A) cathode with natural graphite | Average Running Voltage (Volts) | Capacity mAmp-hr @ 22 mAmp discharge rate to 0.1 V cut off | Energy Output, mWatt-hour |
|---|---|---|---|---|---|
| Ex. 2A CuO and natural graphite (NdG15) | 0.344 | | 0.74 | 506 | 373 |
| Ex. 2B CuO and expanded graphite (WH20) | 0.054 | 84.3 | 0.74 | 518 | 381 |
| Ex. 2C CuO and carbon nanofibers (PR19HT) | 0.054 | 84.3 | 0.75 | 518 | 383 |

Notes:
1. The cathode mixtures were all at 72.2 vol % CuO active material with included aqueous KOH electrolyte as specified in the respective examples.
2. The CuO was ACS (American Chemical Society) grade at 99.5 wt. % purity obtained from Fisher Scientific Company.

TABLE 3

| Cathode | Cathode resistivity ohm-meter | Percent Reduction in resistivity versus (Ex. 3A) cathode with natural graphite | Average Running Voltage (Volts) | Capacity mAmp-hr @ 22 mAmp discharge rate to 0.1 V cut off | Energy Output, mWatt-hour |
|---|---|---|---|---|---|
| Ex. 3A $Cu(OH)_2$ and natural graphite (NdG15) | 234 |  | 0.64 | 212 | 136 |
| Ex. 3B $Cu(OH)_2$ and expanded graphite (WH20) | 2.6 | 98.9 | 0.62 | 204 | 126 |
| Ex. 3C $Cu(OH)_2$ EMD and carbon nanofibers (PR19HT) | 1.03 | 99.6 | 0.62 | 209 | 130 |

Notes:
1. The cathode mixtures were all at 72.2 vol % $Cu(OH)_2$ active material with included aqueous KOH electrolyte as specified in the respective examples. The $Cu(OH)_2$ was resistive copper hydroxide from Aldrich Chemical Co., Inc. Catalog #28,978.7 (assay less than 92 wt. % copper hydroxide).

TABLE 4

| Cathode | Cathode resistivity ohm-meter | Percent Reduction in resistivity versus (Ex. 3A) cathode with natural graphite | Average Running Voltage (Volts) | Capacity mAmp-hr @ 22 mAmp discharge rate to 0.1 V cut off | Energy Output, mWatt-hour |
|---|---|---|---|---|---|
| Ex. 4A $Cu(OH)_2$ and natural graphite (NdG15) | 0.55 |  | 0.71 | 226 | 160 |
| Ex. 4B $Cu(OH)_2$ and expanded graphite (WH20) | 0.11 | 80.0 | 0.70 | 229 | 160 |
| Ex. 4C $Cu(OH)_2$ EMD and carbon nanofibers (PR19HT) | 0.038 | 93.1 | 0.75 | 219 | 165 |

Notes:
1. The cathode mixtures were all at 72.2 vol % $Cu(OH)_2$ active material with included aqueous KOH electrolyte as specified in the respective examples. The $Cu(OH)_2$ was lower resistive copper hydroxide from Alfa Aesar Company, stock #32733 (assay 94 wt % purity copper hydroxide).

The average running voltage for examples 2A–2C (Table 2) employing copper oxide cathode or examples 3A–4C (Tables 3 and 4) comprising copper hydroxide cathode is somewhat lower than corresponding examples 1A–1C utilizing manganese dioxide cathode.

Table 1 shows lowering of cathode resistivity and some improvement in energy output when natural graphite is replaced with expanded graphite or graphitic carbon nanofibers in alkaline cell cathode comprising electrolytic $MnO_2$ (EMD).

Table 2 shows lowering of cathode resistivity when natural graphite is replaced with expanded graphite or graphitic carbon nanofibers in alkaline cell cathodes comprising copper oxide. The capacity is higher in each example summarized in Table 2 when compared to the $MnO_2$ cathodes reported in Table 1.

Table 3 shows very significant lowering of cathode when natural graphite is replaced with expanded graphite or graphitic carbon nanofibers in alkaline cell cathodes comprising highly resistant copper hydroxide. The lowering of cathode resistivity is more pronounced when graphitic carbon nanofibers is employed. The capacity is higher (energy output somewhat lower) in each example in Table 3 when compared to the $MnO_2$ cathodes reported in Table 1.

Table 4 also shows very significant lowering of cathode resistivity when natural graphite is replaced with expanded graphite or graphitic carbon nanofibers in alkaline cell cathodes comprising less resistive copper hydroxide. The lowering of cathode resistivity is more pronounced when graphitic carbon nanofibers is employed. The capacity is higher in each example in Table 4 when compared to the $MnO_2$ cathodes reported in Table 1.

The dramatic lowering of cathode resistivity achieved in alkaline cell copper oxide or copper hydroxide cathodes achieved when natural graphite is replaced with expanded graphite or graphitic carbon nanofbiers, particularly the latter, is very significant. The dramatic lowering of the cathode resistivity in such cells is expected to result in more significant performance improvement when the copper oxide or copper hydroxide alkaline cells with thicker cathodes (e.g. AA, C and D cells) are compared to the same cells with $MnO_2$ cathodes. Also, the achievement of significant lowering of cathode resistivity in copper oxide and copper hydroxide alkaline cells as herein reported sets the stage for further improvement of these cells by including additional cathode additives, for example, titanium compounds and the like.

Although the invention has been described with respect to specific embodiments, it will be appreciated that variations are possible within the concept of the invention. Thus, the invention is not intended to be limited to the specific embodiments herein described, but is better defined by the claims and equivalents thereof.

What is claimed is:

1. An electrochemical cell comprising an anode comprising anode active material, an aqueous alkaline electrolyte solution, a separator, and a cathode comprising copper oxide and carbon nanofibers.

2. The cell of claim 1 wherein the cathode comprises copper oxide and a portion of said aqueous alkaline solution.

3. The cell of claim 1 wherein the anode active material comprises zinc.

4. The cell of claim 1 wherein the electrolyte solution comprises potassium hydroxide.

5. The cell of claim 1 wherein the carbon nanofibers have a diameter less than 500 nanometers.

6. The cell of claim 1 wherein said carbon nanofibers have a mean average diameter between about 50 and 300 nanometers.

7. The cell of claim 1 wherein said carbon nanofibers have a mean average length between about 0.5 and 300 micron.

8. The cell of claim 1 wherein said carbon nanofiber comprises less than 200 million parts by weight metal per million parts carbon.

9. The cell of claim 1 wherein said carbon nanofibers comprises between about 4 and 10 percent by weight of the cathode.

10. The cell of claim 1 wherein said carbon nanofibers comprises graphitic carbon nanofibers.

11. The cell of claim 1 wherein said copper oxide has a purity of at least 97.0 percent by weight.

12. The cell of claim 1 wherein said copper oxide has a purity of between 97.0 and 99.8 percent by weight.

13. The cell of claim 1 wherein the cathode comprises between about 80 and 92 percent by weight copper oxide.

14. The cell of claim 1 wherein the copper oxide is in particulate form having an average particle size between about 1 and 100 micron.

15. The cell of claim 1 wherein said cell comprises less than 50 parts by weight mercury per million parts total cell weight.

16. An electrochemical cell comprising an anode comprising anode active material, an aqueous alkaline electrolyte solution, a separator, and a cathode comprising copper oxide and expanded graphite.

17. The cell of claim 16 wherein the cathode comprises copper oxide and a portion of said aqueous alkaline solution.

18. The cell of claim 16 wherein the anode active material comprises zinc.

19. The cell of claim 16 wherein the electrolyte solution comprises potassium hydroxide.

20. The cell of claim 16 wherein said expanded graphite comprises between about 4 and 10 percent by weight of the cathode.

21. The cell of claim 16 wherein said copper oxide has a purity of at least 97.0 percent by weight.

22. The cell of claim 16 wherein said copper oxide has a purity of between 97.0 and 99.8 percent by weight.

23. The cell of claim 16 wherein the cathode comprises between about 80 and 92 percent by weight copper oxide.

24. The cell of claim 16 wherein the copper oxide is in particulate form having an average particle size between about 1 and 100 micron.

25. The cell of claim 16 wherein said cell comprises less than 50 parts by weight mercury per million parts total cell weight.

26. An electrochemical cell capable of producing electrical energy comprising an anode comprising zinc anode active material, an aqueous alkaline electrolyte solution comprising potassium hydroxide, a separator, and a cathode comprising copper hydroxide and graphitic carbon selected from the group consisting of graphitic carbon nanofibers and expanded graphite, and mixtures thereof.

27. The cell of claim 26 wherein the cathode comprises copper hydroxide and a portion of said aqueous alkaline solution.

28. The cell of claim 26 wherein the graphitic carbon comprises between about 4 and 10 percent by weight of the cathode.

29. The cell of claim 26 wherein said graphitic carbon nanofibers have a diameter less than 500 nanometers.

30. The cell of claim 29 wherein said carbon nanofibers have a mean average diameter between about 50 and 300 nanometers.

31. The cell of claim 29 wherein said carbon nanofibers have a mean average length between about 0.5 and 300 micron.

32. The cell of claim 29 wherein said carbon nanofibers comprise less than 200 parts by weight metal per million parts carbon.

33. The cell of claim 29 wherein said carbon nanofibers comprises between about 4 and 10 percent by weight of the cathode.

34. The cell of claim 26 wherein the cathode comprises between about 80 and 92 percent by weight copper hydroxide.

35. The cell of claim 26 wherein said cell comprises less than 50 parts by weight mercury per million parts total cell weight.

* * * * *